(12) United States Patent
Mozes et al.

(10) Patent No.: US 10,885,047 B2
(45) Date of Patent: Jan. 5, 2021

(54) SYSTEM AND METHOD PROVIDING ASSOCIATION RULE AGGREGATES

(71) Applicant: ORACLE INTERNATIONAL CORPORATION, Redwood Shores, CA (US)

(72) Inventors: Ari W. Mozes, Lexington, MA (US); Dongfang Bai, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 679 days.

(21) Appl. No.: 15/200,028

(22) Filed: Jul. 1, 2016

(65) Prior Publication Data

US 2018/0004816 A1    Jan. 4, 2018

(51) Int. Cl.
*G06F 17/30* (2006.01)
*G06F 16/2458* (2019.01)

(52) U.S. Cl.
CPC ................ *G06F 16/2465* (2019.01)

(58) Field of Classification Search
CPC ................ G06F 17/30539; G06F 16/2465
See application file for complete search history.

(56) References Cited

U.S. PATENT DOCUMENTS

| | | | |
|---|---|---|---|
| 7,720,790 B2 | 5/2010 | Li et al. | |
| 7,756,853 B2 | 7/2010 | Li et al. | |
| 7,962,483 B1* | 6/2011 | Thomas | G06N 5/025 707/736 |
| 8,352,476 B2 | 1/2013 | Li et al. | |
| 10,366,088 B2* | 7/2019 | Shastri | G06Q 30/06 |
| 2003/0212651 A1* | 11/2003 | Hosken | G06Q 30/02 |
| 2010/0131506 A1* | 5/2010 | Shintani | G06Q 30/02 707/737 |
| 2016/0179903 A1* | 6/2016 | Bittmann | G06F 17/30539 707/754 |
| 2017/0091287 A1* | 3/2017 | Wang | G06F 16/2465 |
| 2017/0097982 A1* | 4/2017 | Zhang | G06F 16/285 |

* cited by examiner

*Primary Examiner* — Huawen A Peng
(74) *Attorney, Agent, or Firm* — Kraguljac Law Group, LLC (57) ABSTRACT

Systems, methods, and other embodiments are disclosed for performing data mining. In one embodiment, transaction records are read one at a time. Each transaction record represents a transaction for at least one item and includes an item identifier and a metric value for the item. The number-of-occurrences of at least one candidate item set in the transaction records are counted to generate a total count for the candidate item set. The candidate item set includes one or more items. As the counting proceeds, at least one aggregate metric value associated with the candidate item set is accumulated by summing metric values across the number-of-occurrences for each item represented in the candidate item set. A determination is made as to whether the candidate item set is a frequent item set in the transaction records by comparing the total count to a threshold value.

15 Claims, 6 Drawing Sheets

SYSTEM AND METHOD PROVIDING ASSOCIATION RULE AGGREGATES

BACKGROUND

Association rules are if/then statements that result from uncovering relationships between seemingly unrelated data in a relational database system. An example of an association rule is: "if a customer purchases milk, he is 85% likely to also purchase eggs". An analyst can use data mining techniques to uncover relationships in historical data such that useful association rules can be formed. Association rules provide interesting combinations of things that can be used for sales, marketing, medical diagnosis, etc. Today, once a set of association rules is formed, an analyst may go back and again analyze the historical data to extract metric values (e.g., a revenue) corresponding to, for example, things or combinations of things represented by the association rules. However, each time the data is analyzed, a cost is incurred which may be prohibitively expensive.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Computerized systems, methods, and other computerized embodiments are disclosed that provide a powerful data mining functionality within a database in a single, secure, and scalable platform for advanced business intelligence. Association rules are if/then statements that result from uncovering relationships between data in a relational database system via data mining. An example of an association rule with respect to the purchasing of items is: "if a customer purchases apples (item 1) and bananas (item 2), he is 80% likely to also purchase milk (item 3)". An analyst can use data mining techniques to uncover relationships in historical transaction data for items such that useful association rules can be formed. Association rules provide interesting combinations that can be used for sales and marketing, medical diagnosis, etc. For example, association rules may be used to promote items and/or to make suggestions to customers about additional items to purchase.

Support for simultaneously computing aggregate metrics is provided while determining frequent item sets in transaction data to build association rule models in a relational database system. Such aggregate metrics provide immediate business value by summing metric values of revenue, quantity, profit, etc. for items contained in transactions in a set of transaction data. In accordance with various embodiments, an improvement in the field of data mining is provided such that the system does not have to go back and again analyze the set of transaction data to extract metric values (e.g., a revenue) corresponding to the items or combinations of items represented by the association rules. As a result, the number of accesses to the database is reduced, the amount of network communications is reduced, processing time is reduced, and the data mining resources are more available to other users.

The following terms are used herein with respect to various embodiments.

The term "item", as used herein, may refer to, for example, a product or a service or symptoms of a disease. Other types of items are possible as well.

The term "transaction data", as used herein, refers to data that includes multiple instances of transactions (e.g., customer purchases represented as transaction records) with respect to multiple items represented by an item identifier and one or more metric values for each item of the multiple items.

The term "metric", as used herein, refers to a parameter (e.g., a revenue parameter, a quantity parameter, a profit parameter) associated with an item (e.g., a product). The term "metric value", as used herein, refers to a numerical value associated with a metric.

The term "item set", as used herein, refers to a grouping of item types that occurs in a single transaction by level such as a single level grouping (e.g., {apples}), a paired level grouping (e.g., {apples, bananas}), a triplet level grouping ({apples, bananas, milk}), etc. Other levels of groupings are possible as well to form other item sets. For purposes of ease of discussion, item sets having more than four (4) elements will not be considered in this application. In a set (e.g. a table) of transaction data, multiple instances (e.g., records) of transactions having such groupings may occur. An item set is identified herein by the name of an item enclosed in brackets such as, for example, {apples} and is represented in a relational database system in the form of a data structure.

The term "ordered progression", as used herein, refers to how item sets may be successively taken into consideration as possible or candidate item sets, by level, during data mining. The ordered progression considers single item sets first (e.g., item sets {A}, {B}, {C}), then paired item sets (e.g., item sets {A, B}, {B, C}, {A, C}), then triplet item sets (e.g., item set {A, B, C}), etc. An ordered progression methodology may be used, for example, to identify frequent item sets in a set of transaction data when a retailer wants to consider an entire search space associated with multiple items.

The term "association rule", as used herein, refers to an if/then statement that results from uncovering a relationship between items (e.g., between seemingly unrelated items) represented as data in a relational database system. An example of an association rule is: "if a customer purchases milk, he is 85% likely to also purchase eggs".

The term "confidence value", as used herein, refers to a likelihood value that is associated with an association rule. For example, in the association rule: "if a customer purchases item A and item B, the customer is 85% likely to also purchase item C", the confidence value is 85%.

Overview

A set of transaction data for a retailer documents customer purchases for items sold by the retailer. The set of transaction data may be stored in a database system, for example. The retailer may be interested in sales relationships between some of the items sold. For example, the retailer may be interested in sales relationships involving item A, item B, and item C. Thus, in one embodiment, the retailer may identify the item set {A, B, C} as a candidate item set of interest to be analyzed. In another embodiment, an application running on the database system may identify the candidate item set. For example, an apriori ordered progression methodology may be used to identify candidate item sets by exploring and pruning the universe of possible candidate item sets as described later herein. Analysis by the database system may determine that item set {A, B, C} is a frequent item set. That is, there is at least a certain number or percentage of transactions (a specified threshold number or threshold percentage) in the set of transaction data (e.g., at least 100 transactions out of a total set of 1000 transactions, or 10%) where items A, B, and C were purchased together in the same transaction by a customer.

Determining that candidate item set {A, B, C} is a frequent item set may be accomplished by the database system by counting the number-of-occurrences of transactions in the set of transaction data having all three items A, B, and C and comparing the total count to a threshold value. Different threshold values may be specified for different item sets. For example, a threshold value for item set {A, B, C} may be lower than a threshold value for item set {A, B} since there will be fewer occurrences of item set {A, B, C} than item set {A, B} in the set of transaction data. The counting may be accomplished by the database system using, for example, a prefix tree methodology, a bitmap methodology, or some combination thereof, as described later herein.

In one embodiment, while the instances of transactions having all three items A, B, and C are being counted, one or more metric values associated with each item A, B, and C in the item set are also being aggregated. That is, a running summation of a metric value is occurring simultaneously with the counting. The result is a total count for the item set {A, B, C} and an aggregate metric value for each of item A, item B, and item C of the item set. During the counting process, depending on the methodology used, a total count for one or more of the item sets {A}, {B}, {C}, {A, B}, {A, C} or {B, C} may also be determined, which are subsets of item set {A, B, C}. Such total counts for the subsets may be used for determining confidence values for association rules, as discussed later herein.

The metric value may be a revenue value, for example, associated with each item in each transaction of the set of transaction data. For example, a single quantity of item A may generate revenue of $6 when sold in a single transaction. Therefore, as the 100 instances of item set {A, B, C} are being counted in the set of transaction data, the aggregate revenue metric value of item A is being aggregated (summed) to a value of $600 over 100 instances for item A. In general, however, the revenue generated for a single item can vary over various transactions. Again, the aggregation is done simultaneously while considering whether item set {A, B, C} is a frequent item set via the counting and thresholding process.

An aggregate metric value for an item can be used to determine a worth to the retailer of a frequent item set containing the item. For example, it may be determined that the aggregate revenue value of item A is $600, the aggregate revenue value for item B is $1000, and the aggregate revenue value for item C is $800, resulting in a total aggregate revenue value of $2400 for the frequent item set {A, B, C}. Likewise, the total aggregate revenue value for another frequent item set {B, C, D} may be only $500. Therefore, the retailer may consider the item set {A, B, C} to be worth significantly more than the item set {B, C, D} and decide to promote the frequent item set {A, B, C} in his store (e.g., by co-locating items A, B, C in the store), but not the frequent item set {B, C, D}.

In this manner, identified candidate item sets (e.g., item sets that are of interest to a retailer or identified by the database system) can be considered to determine if the candidate item sets are indeed frequent item sets in a set of transaction data and whether the frequent item sets are worth promoting. Determination of the frequent item sets (via a counting process) and determination of the associated aggregate metric values (via a cumulative summing process) are both performed at the same time in a single pass through the set of transaction data, in accordance with one embodiment, thus providing computerized efficiencies and limited incurred costs. As a result, the number of accesses to the database is reduced, the amount of network communications is reduced, processing time is reduced, and the data mining resources are more available to other users.

Once the frequent item sets are determined, along with the associated aggregate metric values, association rules can be generated based on the items in the frequent item sets. For example, when considering the frequent item set {A, B, C}, one candidate association rule that may be generated is, "if a customer purchases item A and item B, he is 87% likely to also purchase item C". For example, the counting process may have determined that there were 115 transactions for the item set {A, B} where item A and item B were both purchased and, of those 115 transactions, 100 transactions included purchases of item A, item B, and item C. The 87% comes from performing the operation 100/115=0.87 (or 87%) and is known as the confidence value for the association rule. Other candidate association rules may also be generated in a similar manner for other frequent item sets.

The confidence value of an association rule may be compared to a threshold probability level to filter out any "weak" candidate association rules. For example, if a candidate association rule has a confidence value of 45% and the threshold probability level is 65%, then the candidate association rule may be filtered out or discarded since the confidence value of 45% is below the threshold probability level of 65%. However, the candidate association rule in the example above, having a confidence value of 87%, would be designated as a final association rule to be maintained since the confidence value of 87% is above the threshold probability level of 65%. Different threshold probability levels can be specified for different item sets and/or for different association rules associated with those different item sets, in accordance with various embodiments. In this manner, resulting final association rules can be used by a retailer to make decisions with respect to the sales, marketing, and promotion of items.

DETAILED DESCRIPTION WITH RESPECT TO THE DRAWINGS

Figure 1:
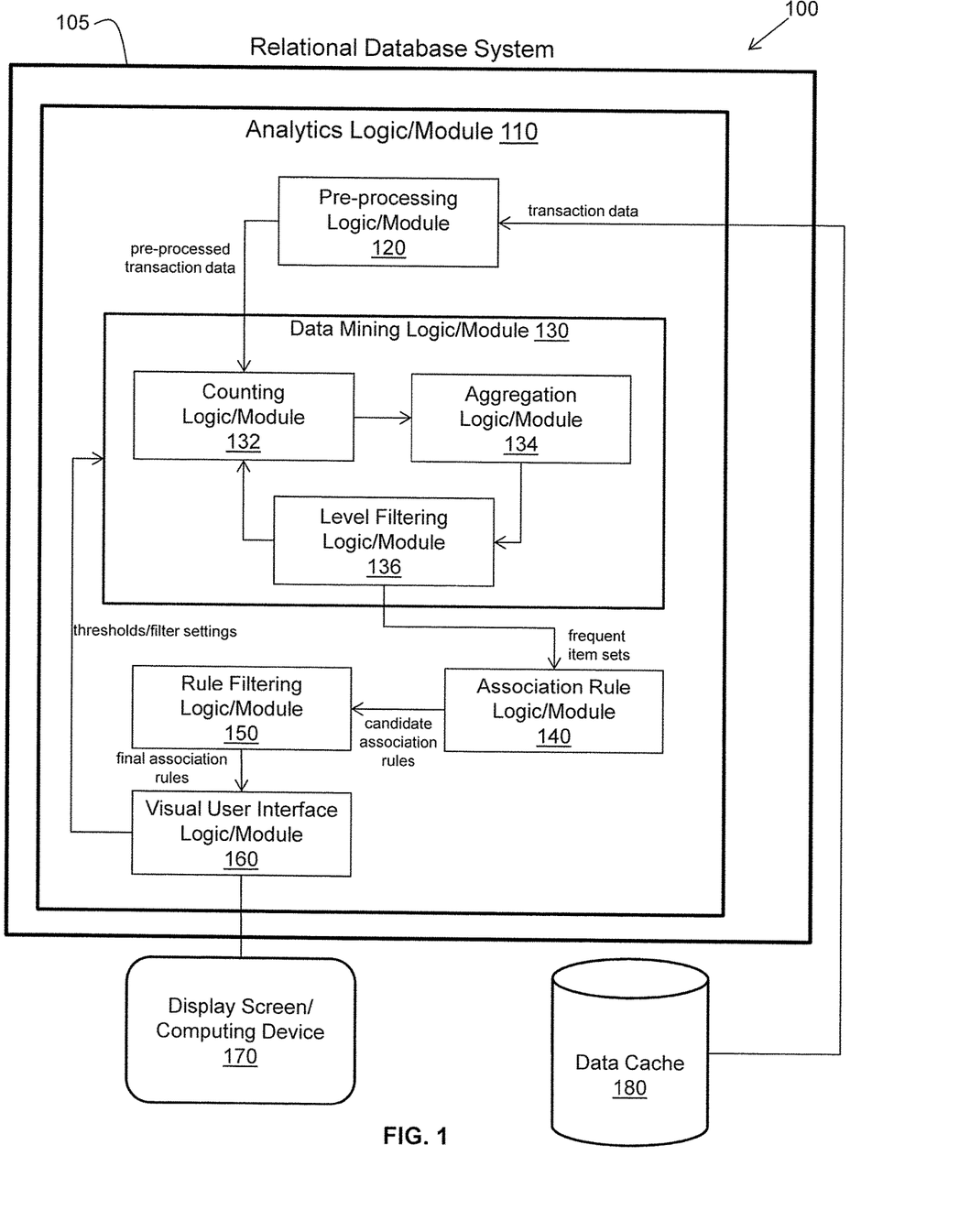
FIG. 1 illustrates one embodiment of a relational database system, having a computing device configured with analytics logic, for determining occurrences of frequent item sets in a set of transaction data while simultaneously aggregating metric values associated with the item sets.

FIG. 1 illustrates one embodiment of a relational database system 100, having a computing device 105 configured with analytics logic 110, for determining occurrences of frequent item sets in a set of transaction data while simultaneously aggregating metric values associated with the item sets. The item sets and the set of transaction data are types of data structures represented in the relational database system 100. In one embodiment, analytics logic 110 may be part of a larger computer application (e.g., a computerized database application), configured to help analysts and data scientists extract useful information from large sets of data for a retailer. Analytics logic 110 is configured to computerize the process of finding valuable associations between items (e.g. products or services) represented as transactions in large sets of transaction data.

In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, analytics logic/module 110 is implemented on the computing device 105 and includes logics or modules for implementing and controlling various functional aspects of analytics logic/module 110. In one embodiment, analytics logic/module 110 includes pre-processing logic/module 120, data mining logic/module 130 (which includes counting logic/module 132, aggregation logic/module 134, and level filtering logic/module 136), association rule logic/module 140, rule filtering logic/module 150, and visual user interface logic/module 160.

Other embodiments may provide different logics or combinations of logics that provide the same or similar functionality, and control of that functionality, as analytics logic 110 of FIG. 1. In one embodiment, analytics logic 110 is an executable application including algorithms and/or program modules configured to perform the functions of the logics. The application is stored in a non-transitory computer storage medium. That is, in one embodiment, the logics of analytics logic 110 are implemented as modules of instructions stored on a computer-readable medium.

The relational database system 100 also includes a display screen 170 operably connected to the computing device 105. In accordance with one embodiment, the display screen 170 is implemented to display views of and facilitate user interaction with a graphical user interface (GUI) generated by visual user interface logic 160. The graphical user interface may be used, for example, for identifying candidate item sets, for specifying filter or threshold settings, for specifying metrics to be used, and for viewing resultant association rules. The graphical user interface may be associated with an analytics algorithm and visual user interface logic 160 may be configured to generate the graphical user interface.

In one embodiment, the relational database system 100 is a centralized server-side application that provides at least the functions disclosed herein and that is accessed by many users via computing devices/terminals communicating with the relational database system 100 (functioning as the server) over a computer network. Thus the display screen 170 may represent multiple computing devices/terminals that allow users (e.g., retail analysts) to access and receive services from analytics logic 110 via networked computer communications.

In one embodiment, the relational database system 100 further includes data cache 180 operably connected to the computing device 105 and/or a network interface to access the data cache 180 via a network connection. In accordance with one embodiment, the data cache 180 is configured to store sets of transaction data. The data cache 180 may also store, for example, resultant association rules including corresponding confidence values.

Referring back to the logics of analytics logic 110 of FIG. 1, in one embodiment, visual user interface logic 160 is configured to generate a graphical user interface (GUI) to facilitate user interaction with analytics logic 110. For example, visual user interface logic 160 includes program code that generates and causes the graphical user interface to be displayed based on an implemented graphical design of the interface. In response to user actions and selections via the GUI, associated aspects of analytics logic 110 may be manipulated. In one embodiment, visual user interface logic 160 is configured to facilitate user specification of threshold settings as discussed in more detail later herein.

Referring again to FIG. 1, in one embodiment, pre-processing logic 120 is configured to read a set of transaction data stored in the data cache 180 of the relational database system 100. The transaction data includes multiple instances of transactions (e.g., customer purchases) with respect to multiple items. In the set of transaction data, each instance of an item is represented by at least an item identifier and a metric value. In another embodiment, pre-processing logic 120 is not present and the transaction data is read by counting logic 132 of data mining logic 130. In accordance with one embodiment, the set of transaction data includes multiple transaction records, where each transaction record represents a single customer transaction and is read one at a time by pre-processing logic 120 or counting logic 132.

Pre-processing logic 120 is also configured to pre-process the transaction data to filter out a subset of transactions from the transaction data and/or to prepare the transaction data for subsequent processing. For example, in one embodiment, pre-processing logic 120 may filter out items based on the item identifiers. A user may specify, via the graphical user interface or an application program interface, certain items that are not of interest, and that such items should be excluded from consideration in the transaction data. In another embodiment, pre-processing logic 120 may filter out items based on the metric values. For example, a user may specify that items having a certain metric value that is below a certain amount is not of interest, and that such items should be excluded from consideration in the transaction data. In this way, time and resources are not wasted processing and analyzing transaction data that is not of interest to the user.

In one embodiment, pre-processing logic 120 is configured to position items in each transaction record in a canonical order, for example, in preparation for applying a prefix tree methodology, as discussed later herein with respect to FIG. 4, to count occurrences of an item set in a set of transaction data. For example, if a transaction record includes items G, C, A, B, D, pre-processing logic 120 is configured to re-order the items canonically (e.g., in alphabetical order) as A, B, C, D, G such that the items are processed in the canonical order. In another embodiment, pre-processing logic 120 is configured to generate bitmap arrays and corresponding metric value arrays for items associated with a candidate item set in preparation for applying a bitmap methodology, as discussed later herein with respect to FIG. 5, to count occurrences of an item set in a set of transaction data.

In one embodiment, counting logic 132, of data mining logic 130, is configured to read the pre-processed transaction data (e.g., one pre-processed transaction record at a time) out of pre-processing logic 120. However, in embodiments where pre-processing logic 120 is not present, counting logic 132 is configured to read a set of transaction data (e.g., one transaction record at a time) stored in the data cache 180 of the relational database system 100. Again, the transaction data includes multiple instances of transactions (e.g., customer purchases) with respect to multiple items, and each instance of an item is represented by at least an item identifier and a metric value.

In one embodiment, counting logic 132 is also configured to count a number-of-occurrences of at least one candidate item set to generate a total count for the candidate item set in the set of transaction data. The candidate item set is under consideration to determine if the candidate item set should be designated or confirmed as being a frequent item set in the set of transaction data (i.e., an item set that occurs frequently in the set of transaction data). The counting may be performed as part of a prefix tree methodology or a bitmap methodology as discussed later herein. Other counting methodologies may be possible as well, in accordance with other embodiments. Such a frequent item set may be of great interest to a retailer, for example, with respect to promoting items in the frequent item set or making purchasing suggestions to customers.

As counting logic 132 is counting to generate a total count for one or more item sets, aggregation logic 134 is simultaneously generating aggregate metric values for the item sets during the counting. In one embodiment, aggregation logic 134 sums metric values (e.g., revenue values) across the number-of-occurrences of each item represented in an item set to generate aggregate metric values (e.g., aggregate revenue values).

For example, an aggregate (revenue) metric value for an item A may be determined when counting transactions which include all elements of the candidate item set that includes items A, B, and C (i.e., {A, B, C}). An aggregate (revenue) metric value for item B may also be determined when counting transactions which include all elements of the candidate item set {A, B, C}. Furthermore, an aggregate (revenue) metric value for item C may also be determined when counting transactions which include all elements of the candidate item set {A, B, C}.

The total metric value for the candidate item set {A, B, C} may be determined to be the sum of the aggregate (revenue) metric values for A, B, and C as determined above. Such a total metric value for the item set {A, B, C} is not the same as the sum of the metric values for all A's, all B's, and all C's in the set of transaction data, however. Instead, the total metric value is limited to all of the single transactions which include all of the items A, B, and C.

As counting logic 132 is counting to determine total counts for candidate item sets, level filtering logic 136 is configured to filter out uncommon sets from the candidate item sets, leaving frequent item sets remaining. In one embodiment, the filtering is performed based on the total count of each candidate item set. As an example, the number of counted occurrences (total count) of some candidate item sets may be as follows:

item set {A}=1000 occurrences;
item set {B}=5000 occurrences;
item set {C}=3000 occurrences;
item set {A, B}=800 occurrences;
item set {B, C}=1500 occurrences;
item set {A, C}=400 occurrences;
item set {A, B, C}=250 occurrences.

In one embodiment, level filtering logic 136 uses a specified threshold value (numerical or percentage) to identify and filter out uncommon candidate item sets, and to identify and confirm frequent item sets. As an example, the threshold value for the various item sets may be specified to be 850 occurrences. The threshold value may be specified automatically by analytics logic 110 or by a user via the graphical user interface or an application program interface.

Based on the specified threshold value of 850 occurrences, level filtering logic 136 can filter out the candidate item sets {A, B}, {A, C}, and {A, B, C} since the number-of-occurrences for the candidate item sets {A, B}, {A, C}, and {A, B, C} falls below the threshold value of 850 occurrences. In this way, uncommon sets can be eliminated from the candidate item sets to save on processing and resources. As a result, the remaining frequent item sets are {A}, {B}, {C}, and {B, C}.

Extending the example further, if the number-of-occurrences for item set {A} is 800 occurrences instead of 1000 occurrences, then data mining logic 130 does not have to bother considering item set {A, B} (e.g., in an ordered progression methodology) because of the threshold value being 850 occurrences for all item sets. That is, for item set {A, B} to get to at least the threshold value of 850 occurrences, item set {A} would have to have at least 850 occurrences, which it does not (i.e., item set {A} only has 800 occurrences in this extended example). In this way, the data mining logic 130 is able to limit or prune the candidate item sets that have to be considered, thus saving processing time and resources (especially in an ordered progression methodology). However, such limiting or pruning of candidate item sets may not be possible in other embodiments where different threshold values are specified for different candidate item sets.

Once the frequent item sets are determined from the candidate item sets by data mining logic 130, the frequent item sets are sent, along with the corresponding number-of-occurrences (total counts) and aggregate metric values, to association rule logic 140. In one embodiment, association rule logic 140 is configured to generate candidate association rules based at least in part on the frequent item sets and the total counts of the frequent item sets. Each association rule associates at least two items of a frequent item set in an if-then relationship and includes a confidence value that is based in part on the total count for the frequent item set.

In accordance with one embodiment, the candidate association rules are formed based on the number of all of the possible combinations of item sets making up the frequent item sets. In accordance with other embodiments, the candidate association rules are formed based on other factors (e.g., factors of importance to the user) and result in a number of candidate association rules that are less than the number of all possible combinations of the items sets making up the frequent item sets (maybe significantly less). The confidence value for an association rule can be calculated by association rule logic 140 based in part on the total count for a frequent item set, upon which the association rule is based, and basic mathematics. One common set of association rules that may be considered to be formed based on a frequent item set having N items are N single-consequent rules. In a set of N single-consequent rules, each of the N items is the single consequent in an association rule with N−1 items being on the left side of the association rule. For example, for frequent item set {A, B, C}, N equals three (3) and the N single-consequent association rules are: if (A, B) then C, if (A, C) then B, and if (B, C) then A.

For example, a frequent item set may be {A, B, C}, having a total count of 1000 occurrences in a set of transaction data. A candidate association rule that is considered to be important and which can be generated based on the frequent item set {A, B, C} may be, "if A AND B, then C". During the counting process, it may have been determined that the total count for item set {A, B} was 1400 occurrences. Therefore, using the total count of 1000 for item set {A, B, C} and 1400 for item set {A, B}, the confidence value for the candidate association rule "if A AND B, then C", is calculated as (1000/1400×100)=71.4%. That is, in a transaction where a customer purchases both item A and item B, the customer is 71.4% likely to also purchase item C in the same transaction.

Other candidate association rules that may be formulated by association rule logic 140 based on frequent item set {A, B, C} are, for example:

"if A AND C, then B";
"if B AND C, then A";
"if A, then B AND C.

Each candidate association rule will have a confidence value which reflects the strength of association based on the total counts of the corresponding item sets. Candidate association rules having "weak" associations (i.e., low confidence values) may be discarded.

For example, in one embodiment, rule filtering logic 150 is configured to identify a set of final association rules by filtering out (excluding) one or more association rules from the candidate association rules. The filtering is performed based on the confidence value. For example, in one embodiment, rule filtering logic 150 may filter out any association rule of a set of candidate association rules having a confidence value of less than 65%. A threshold probability level may be specified automatically by analytics logic 110, or manually by a user via the graphical user interface (or an application program interface), in accordance with various embodiments, and used in a comparison process (i.e., comparing a confidence value to a threshold probability level). The final association rules (having confidence values that are greater than the threshold probability value) may be stored in data cache 180, in accordance with one embodiment.

In another embodiment, the aggregate metric value of a frequent item set, from which an association rule is derived, may be used to filter out an association rule by comparing the aggregate metric value to an aggregate metric value threshold via rule filtering logic 150. In still another embodiment, a combination of a confidence value and an aggregate metric value may be used to filter out an association rule via rule filtering logic 150.

In this manner, a final set of valuable association rules can be generated. The importance or worth of the final association rules is determined at the time that the association rules are formed because the aggregate metric values are calculated at the same time the number-of-occurrences are counted in the data mining process as described herein. The system 100 does not have to spend further time and resources in a post-processing manner (which can be expensive) to calculate aggregate metric values based upon the previous associations found in the transaction data. The system 100 greatly improves performance by computing valuable metrics (e.g., revenue, quantity, profit, etc.) while the number-of-occurrences are being counted to determine the frequent item sets.

Figure 2:
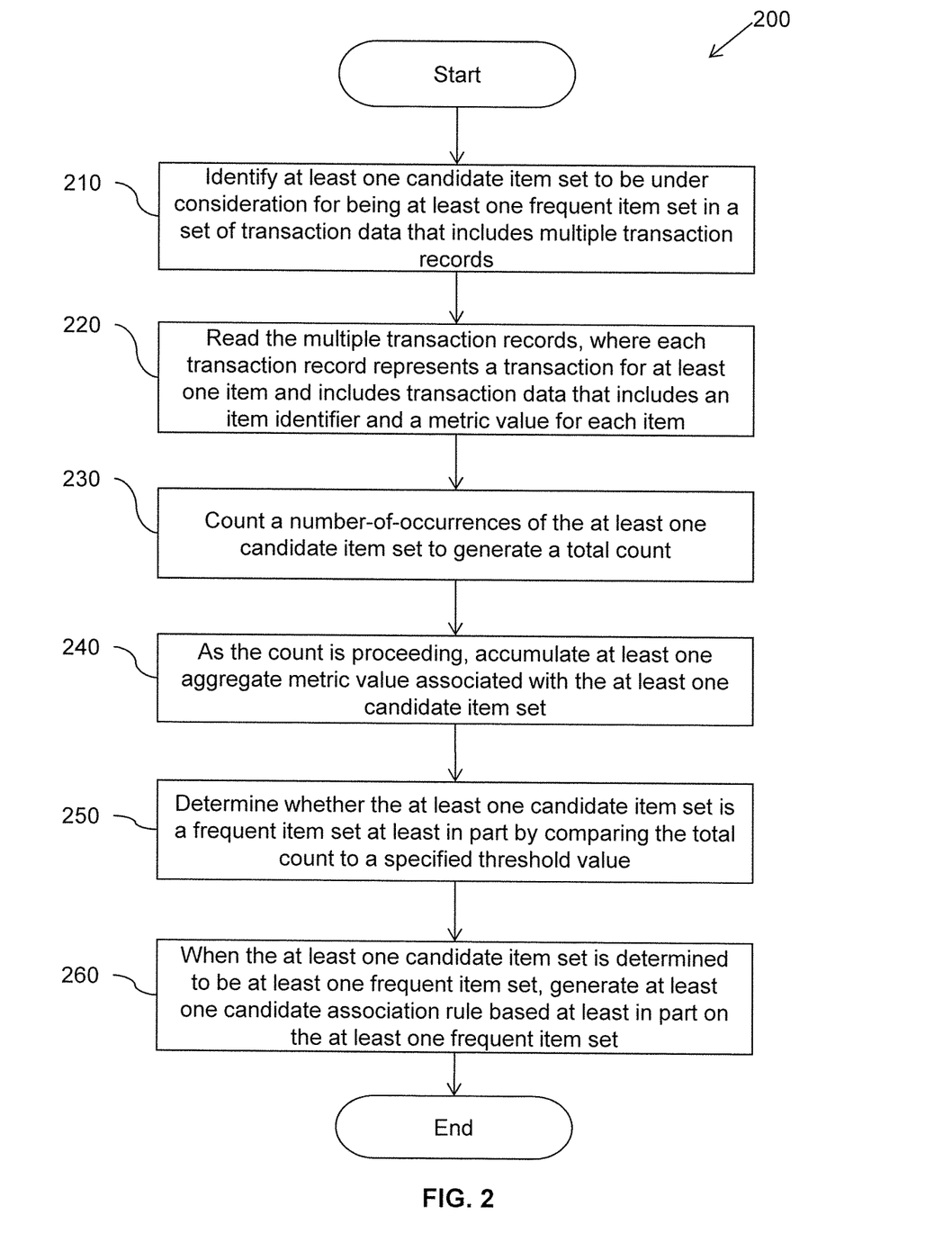
FIG. 2 illustrates one embodiment of a method, which can be performed by the analytics logic of the relational database system of FIG. 1, to perform data mining on a set of transaction data and generate association rules based on item sets and aggregate metric values resulting from the data mining.

FIG. 2 illustrates one embodiment of a method 200, which can be performed by analytics logic 110 of the relational database system 100 of FIG. 1, to perform data mining on a set of transaction data and generate association rules based on item sets and aggregate metric values resulting from the data mining. Method 200 describes operations of analytics logic 110 and is implemented to be performed by analytics logic 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that data mining can be performed by a relational database system on sets of transaction data to find useful relationships that are beneficial to a retailer. Such useful relationships can be discovered and quantified while processing the transaction data, without having to spend further time and resources performing any post-processing, thus saving processing time and resources.

Upon initiating method 200, at block 210, at least one candidate item set is identified. The candidate item set is under consideration for being a frequent item set in a set of transaction data that includes multiple transaction records stored, for example, in a data cache of a relational database system. In one embodiment, identifying a candidate item set is accomplished by performing a search (e.g., in an ordered progression) over an item search space associated with multiple items. An ordered progression methodology is discussed in detail later herein. In another embodiment, identifying of a candidate item set is accomplished by user specification of the candidate item set via a graphical user interface or an application program interface. Such user specification may be based on user preferences or other knowledge that the user has about the items in the candidate item set, for example. In still another embodiment, identifying of a candidate item set is accomplished automatically by application specification of the candidate item set via an application of the relational database system. For example, a pre-analysis of transaction data by the application may determine that certain item sets are more important than others based on some criteria and should be identified as being candidate item sets.

At block 220, transaction records are read, one at a time, from the data cache. Each transaction record represents a transaction for at least one item and includes transaction data that includes an item identifier and at least one metric value for each item. In accordance with one embodiment, reading of the transaction records is performed by pre-processing logic 120 and/or counting logic 132 of FIG. 1. The metric values for each item in the transaction records may include one or more of a revenue value, a quantity value, or a profit value, for example. The revenue value represents the revenue received for an item in a transaction represented in the transaction data. The quantity value represents the quantity of an item purchased in a transaction represented in the transaction data. The profit value represents the profit made on an item in a transaction represented in the transaction data. Other metrics are possible as well, in accordance with other embodiments.

At block 230, a number-of-occurrences of the identified candidate item sets in the transaction records is counted to generate a total count for each candidate item set. For example, if a candidate item set is {A, B, C}, each transaction record is checked to determine if the associated transaction includes item A, item B, and item C. The number of single transaction records that include item A, item B, and item C are counted to form a total count for item set {A, B, C}. Various methodologies may be used to perform the counting for a candidate item set, including a prefix tree methodology and a bitmap methodology as described later herein. In accordance with one embodiment, the counting is performed by counting logic 132 of FIG. 1.

At block 240, as the counting is proceeding, at least one aggregate metric value associated with the candidate item set is accumulated (aggregated) by summing metric values across the number-of-occurrences for each item represented in the candidate item set. For example, when the candidate item set is {A, B, C}, revenue for item A, item B, and item C may be aggregated during the counting to form an aggregate revenue value for item A, an aggregate revenue value for item B, and an aggregate revenue value for item C. For example, if the total count for item set {A, B, C} is 1000, and the revenue generated in each transaction is $2 for item A, then the aggregate revenue value for item A will be $2000. If the revenue generated in each transaction is $3 for item B, then the aggregate revenue value for item B will be $3000. If the revenue generated in each transaction is $0.50 for item C, then the aggregate revenue value for item C will be $500. In accordance with one embodiment, the accumulating is performed by aggregation logic 134 of FIG. 1. In the above example, the revenue value for a given item is the same across all of the transactions. However, many times, the revenue generated for an item may be different in different transactions. In such cases, the benefit of performing aggregation during counting can be clearly appreciated.

At block 250, a determination is made as to whether the candidate item set is a frequent item set, occurring in the transaction records, by comparing the total count for the candidate item set to a specified threshold value. In accordance with one embodiment, the determination is made by level filtering logic 136. The specified threshold value may be specified, for example, by a user via a graphical user interface generated by visual user interface logic 160 of FIG. 1, or by an application program interface of data mining logic 130.

At block 260, at least one candidate association rule is generated based on the frequent item set. Each candidate association rule associates at least two item sets in an if-then relationship and includes a confidence value that is based at least in part on the total count for the frequent item set. In accordance with one embodiment, the candidate association rules are generated by association rule logic 140 of FIG. 1.

Final association rules may be identified as a subset of the candidate association rules by filtering out one or more association rules from the candidate association rules based on, for example, the confidence value for each association rule. For example, the candidate association rules having a low confidence value (e.g., less than 60%) may be filtered out. The confidence value for an association rule can be determined from the counted number-of-occurrences (total counts) of the item sets used in the association rule, as previously described herein. In accordance with one embodiment, association rules are filtered out by rule filtering logic 150 of FIG. 1.

In accordance with one embodiment, user specification of filter settings is facilitated via a graphical user interface that is generated by visual user interface logic 160 of FIG. 1 or by an application program interface provided by analytics logic 110. The filter settings represent at least a specified threshold probability level and are used in a comparison process for filtering out association rules from the candidate association rules (i.e., the confidence value is compared to a respective specified threshold probability level).

In another embodiment, the aggregate metric value of a frequent item set, from which an association rule is derived, may be used to filter out an association rule by comparing the aggregate metric value to an aggregate metric value threshold. In still another embodiment, a combination of a confidence value and an aggregate metric value may be used to filter out an association rule.

In this manner, a final set of valuable association rules can be generated. The importance or value of the final association rules is determined at the time that the association rules are formed, at least because the aggregate metric values are calculated at the same time the number-of-occurrences are counted in the data mining process as described herein. The method 200 does not have to spend additional time and resources (which can be expensive), in a post-processing manner, to calculate aggregate metric values based upon the previous associations found in the transaction data. The method 200 greatly improves computer performance by computing valuable metrics (e.g., revenue, quantity, profit, etc.) while performing a counting process to count the number-of-occurrences of candidate item sets.

Figure 3:
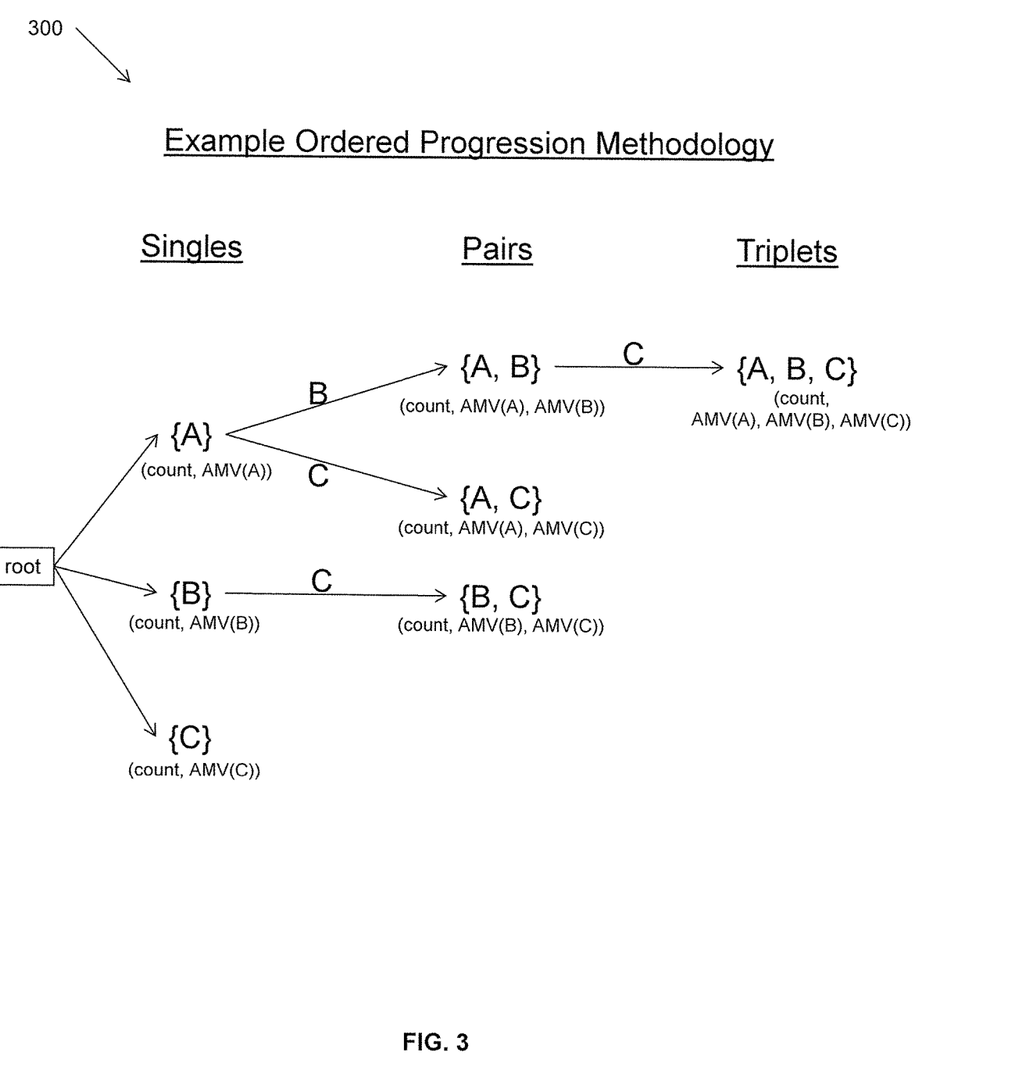
FIG. 3 graphically illustrates an example embodiment of an ordered progression methodology, which can be performed as part of a data mining operation of the method of FIG. 2 implemented in the analytics logic of FIG. 1, to identify item sets in a set of transaction data.

FIG. 3 graphically illustrates an example embodiment of an ordered progression methodology 300, which can be performed as part of the data mining operation of the method 200 of FIG. 2 implemented in the analytics logic 110 of FIG. 1. The ordered progression methodology may be used when a user wants an entire search space of items in the transaction data to be considered. That is, the user may not have any prior interest in any particular frequent item sets that may exist in the transaction data and, therefore, allows the entire search space to be considered for frequent item sets.

During an ordered progression methodology, occurrences of item sets in a set of transaction data are identified. In one embodiment, pre-processing logic 120 of FIG. 1 is configured to identify, in an ordered progression, each single item, then each pair of different items, then each triplet of different items, etc., of the multiple items occurring in single transactions across a set of transaction data. In this way, frequent item sets at different levels (singles, pairs, triplets, etc.), occurring in the transaction data, can be progressively identified over an entire item search space.

A counting process (e.g., a prefix tree methodology or a bitmap methodology performed by counting logic 132 of FIG. 1) may count instances of item identifiers read in the transactions of a set of transaction data, in accordance with one embodiment. As an example, referring to FIG. 3, counting logic 132 may first consider single items sets {A}, {B}, and {C} by counting 1000 occurrences of item A occurring in single transactions of the transaction data, 5000 occurrences of item B occurring in single transactions of the transaction data, and 3000 occurrences of item C occurring in single transactions of the transaction data. Next, counting logic 132 may consider paired item sets {A, B}, {B, C}, and {A, C} by counting 800 occurrences of items A and B occurring together in single transactions of the transaction data, 1500 occurrences of items B and C occurring together in single transactions of the transaction data, and 400 occurrences of items A and C occurring together in single transactions of the transaction data. Then, counting logic 132 may consider triplet item set {A, B, C} by counting 250 occurrences of items A, B, and C occurring together in single transactions of the transaction data. In this way, item sets are successively taken into consideration by level (i.e., in the ordered progression) during data mining.

Furthermore, in accordance with one embodiment, as the item sets are being considered during the ordered progression methodology, uncommon sets may be filtered out along the way based on the number-of-occurrences for the item sets. Such filtering may result in some items sets not having to be considered, thus saving processing time and resources.

At each level, aggregate metric values are being accumulated during the counting process as previously described herein. Initially, as total counts are being generated for the single item sets {A}, {B}, and {C}, aggregate metric values (AMV) are also being accumulated for each item in the single item sets. Next, as total counts are being generated for paired item sets {A, B}, {A, C}, and {B, C}, aggregate metric values (AMV) are also being accumulated for each item in the paired item sets. Finally, as a total count is being generated for the triplet item set {A, B, C}, aggregate metric values (AMV) are also being accumulated for each item in the triplet item set.

Counting Methodologies

Various types of counting methodologies may be employed (e.g., by counting logic 132 of FIG. 1) to count the number-of-occurrences of candidate item sets within a set of transaction data once the candidate item sets are identified. Two such counting methodologies are discussed herein and include a prefix tree methodology and a bitmap methodology. In some embodiments, the methodologies can be used in combination. For example, in one embodiment, the counting may switch being the prefix tree methodology and the bitmap methodology. For example, the bitmap methodology may be used when considering paired item sets, and the prefix tree methodology may be used when considering triplet item sets.

Figure 4:
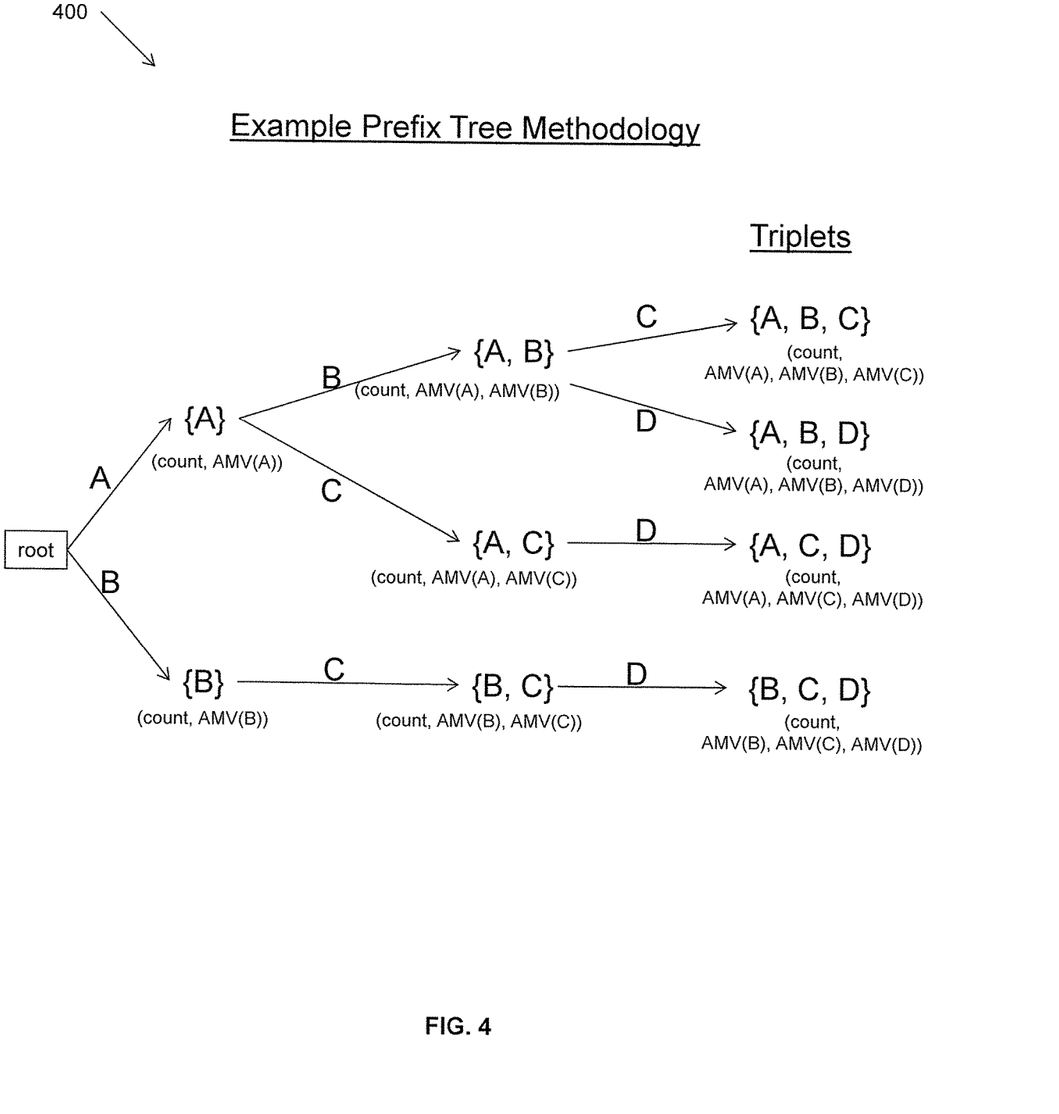
FIG. 4 graphically illustrates an example embodiment of a prefix tree methodology, which can be performed as part of a data mining operation of the method of FIG. 2 implemented in the analytics logic of FIG. 1, to count occurrences of item sets in a set of transaction data.

FIG. 4 graphically illustrates an example embodiment of a prefix tree methodology 400, which can be performed as part of a data mining operation of the method 200 of FIG. 2 implemented in the analytics logic 110 of FIG. 1. During a prefix tree methodology, occurrences of certain item sets in a set of transaction data are counted while simultaneously aggregating metric values. When a prefix tree method is used to count the candidate item sets of a level (e.g., a triplet), a prefix tree is built from the candidate item sets of that level. U.S. Pat. No. 7,720,790 describes a prefix tree methodology in column 14 lines 12-67 and column 15 lines 1-15 which are incorporated herein by reference.

In the example of FIG. 4, a prefix tree methodology is applied to count the triplet candidate item sets {A, B, C}, {A, B, D}, {A, C, D}, and {B, C, D} which are of interest to a retailer. First, a prefix tree is built from the candidate item sets in such a way that all the descendants of a tree node have a common prefix of an item set associated with that node. For example, all candidate item sets starting with item set {A} are contained in the sub-tree with node {A} as root, and all candidate item sets starting with item set {A, B} are contained in the sub-tree with node {A, B} as root.

The prefix tree is N levels deep, where N is the number of items in the candidate item sets that are being considered (e.g., N=3). Each node in the tree is associated with an item set. Based on the candidate item sets, the prefix tree 400 may be generated by, for example, pre-processing logic 120, in accordance with one embodiment. Each leaf node of the prefix tree represents an N-item combination that includes the item set associated with the leaf node and the item sets associated with the nodes that are to be traversed to reach the leaf node. In the example of FIG. 3, N=3 since the candidate item sets being considered are triplets. However, not all of the candidate item sets being considered have to be of the same level (e.g., a triplet), in accordance with other embodiments.

In one embodiment, once the prefix tree is constructed, counting logic 132 iterates through each item set in the population, incrementing a count at each leaf node that represents an item set. That is, each transaction in the set of transaction data is checked against the prefix tree to update the occurrences of relevant candidate item sets. For example, consider checking a transaction containing items (A, C, D, E) against the tree shown in FIG. 3. Here, the items in the transaction have already been canonically sorted, for example, by pre-processing logic 120.

As discussed previously herein, in one embodiment, pre-processing logic 120 is configured to position items in each transaction record in a canonical order, for example, in preparation for applying the prefix tree methodology. For example, if a transaction record includes items (G, C, A, B, D), pre-processing logic 120 is configured to re-order the items canonically (e.g., in alphabetical order) as (A, B, C, D, G) such that the items are processed in the new order.

Since the transaction in the previous example contains items (A, C, D, E), candidate item sets starting with {A} and {C} are considered. Since each candidate contains three items, there is no need to consider candidates starting with {D} and with {E}. Also, because the prefix tree does not contain node {C}, indicating that there is no candidate item set starting with {C}, there is no need to consider {C} as well.

The prefix tree does contain node {A}, which indicates that there are candidate item sets having {A} as prefix. The prefix tree methodology moves to node {A} and then checks whether there are candidate item sets starting with {A, C} and {A, D}. Since the prefix tree contains node {A, C}, indicating there are candidates starting with {A, C}, the prefix tree method then moves to node {A, C} and checks whether there are candidates starting with {A, C, D} and {A, C, E}. Since the tree contains node {A, C, D}, indicating that there are candidates starting with {A, C, D}, the prefix tree method moves to node {A, C, D}. At this point, since triplets are being counted, the prefix tree method knows that {A, C, D} is one candidate to count and will increase the count for {A, C, D} by one. The prefix tree does not contain nodes {A, D} and {A, C, E}. Therefore, the current transaction having items (A, C, D, E) is finished being processed through the prefix tree. Other transactions may be processed through the prefix tree as well in a similar manner.

In accordance with one embodiment, as the item sets are being considered during the prefix tree methodology, the number-of-occurrences are being counted and the aggregate metric values are simultaneously being generated for the items in the item sets. The count for the triplet item set and the aggregate metric value (AMV) for each item in the triplet in the prefix tree of FIG. 4 is represented as (count, AMV (item 1), AMV(item 2), AMV(item 3)). For example, for triplet item set {A, B, C}, a final count and AMV (revenue) may be (200, $1000(item A), $500(item B), $2500(item C)) based on the set of transaction data. Again, the total counts for the candidate item sets may be compared to a threshold to determine frequent item sets, and the frequent item sets may be used to form association rules as described previously herein.

Figure 5:
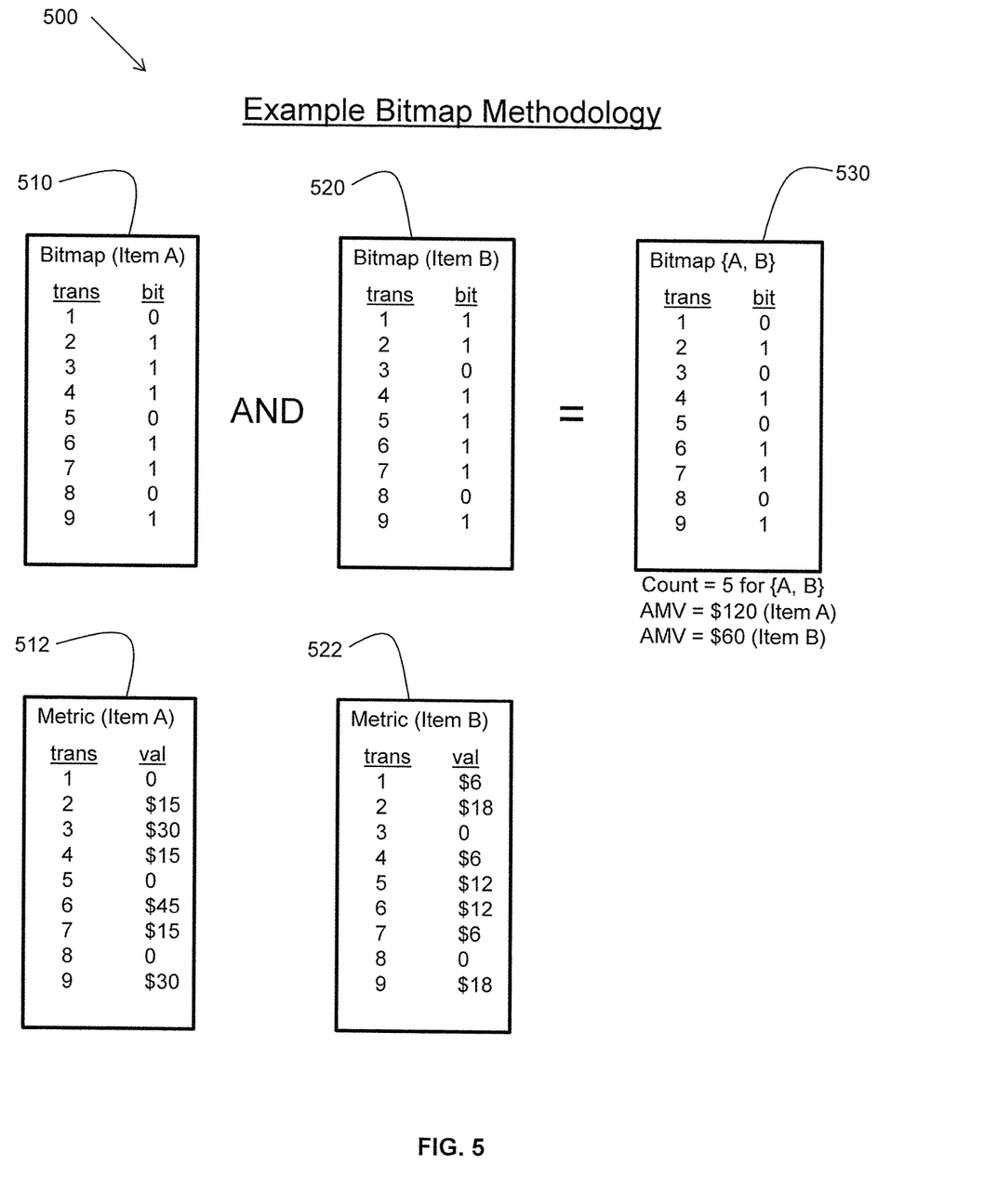
FIG. 5 graphically illustrates an example embodiment of a bitmap methodology, which can be performed as part of a data mining operation of the method of FIG. 2 implemented in the analytics logic of FIG. 1, to count occurrences of item sets in a set of transaction data.

FIG. 5 graphically illustrates an example embodiment of a bitmap methodology 500, which can be performed as part of a data mining operation of the method 200 of FIG. 2 implemented in the analytics logic 110 of FIG. 1, to count occurrences of item sets in a set of transaction data. In the example of FIG. 5, two items A and B are considered in a transaction set having nine (9) transactions. A bitmap 510 is formed for item A. The bitmap includes a "1" value for transactions in which item A exists, and a "0" value for transactions in which item A does not exist.

Also, a corresponding metric array 512 is formed for item A which lists a metric value (e.g., a revenue value) for every transaction in the transaction set where item A exists. For example, the revenue generated when a single quantity of item A is sold may be $15. Transaction two (2) in metric array 512 shows a $15 revenue value for item A, whereas transaction six (6) shows a $45 revenue value for item A. This may imply that, in transaction six (6), three (4) quantities of item A were sold. However, in general, the revenue generated for a single item can vary over various transactions.

A similar bitmap array 520 and metric array 522 are formed for item B. The bitmap for item A represents an item set for item A (i.e., item set {A}), where item A is included in six (6) transactions. The bitmap for item B represents an item set for item B (i.e., item set {B}), where item B is included in seven (7) transactions. In accordance with one embodiment, pre-processing is performed by pre-processing logic 120 of FIG. 1 to generate the bitmap arrays and the metric arrays for item A and item B.

In the example of FIG. 5, the bitmap methodology 500 forms a bitmap array 530 representing item set {A, B} by performing a logical "AND" operation on bitmap arrays 510 and 520 as follows: {A} AND {B}={A, B}, were item set {A, B} includes five (5) transactions. Therefore, the count for item set {A, B} would be five (5). Furthermore, the aggregate metric value (AMV) for item A of item set {A, B} is $120 in revenue, and the aggregate metric value (AMV) for item B of item set {A, B} is $60 in revenue, as shown in FIG. 5. In accordance with one embodiment, the AND operations and the counting of the resulting bitmap arrays are performed by counting logic 132 of FIG. 1. Aggregation of the metric values from the metric arrays are generated by aggregation logic 134 of FIG. 1 based on the corresponding bitmap arrays.

In this manner, by representing item sets as bitmap arrays along with corresponding metric arrays, the logical "AND" operation can be used to form subsequent candidate item sets. For example, in an example which considers three (3) items A, B, and C, the candidate item set {A, B, C} may be formed using the bitmap methodology, as follows: generate a bit map array and a corresponding metric array for each of item sets {A}, {B}, {C}; then form a bitmap array for item set {A, B} as {A} AND {B}={A, B}; then form a bitmap array for item set {A, B, C} as {A, B} AND {C}={A, B, C}. Metric values for the transactions in the corresponding single item bitmap arrays having "1" values may be summed to form aggregate metric values (AMV(A), AMV(B), AMV (C)).

In accordance with one embodiment, as the item sets are being considered during the bitmap methodology, the number-of-occurrences are being counted and the aggregate metric values are simultaneously being generated for the items of the item sets. Frequent item sets may be determined and various association rules may subsequently be formed based on the frequent item sets as previously described herein.

Furthermore, in accordance with one embodiment, as the item sets are being identified during the bitmap methodology, uncommon sets may be filtered out along the way based on the number-of-occurrences for the item sets. Such filtering may result in some items sets not having to be considered, thus saving processing time and resources.

Computing Device Embodiment

Figure 6:
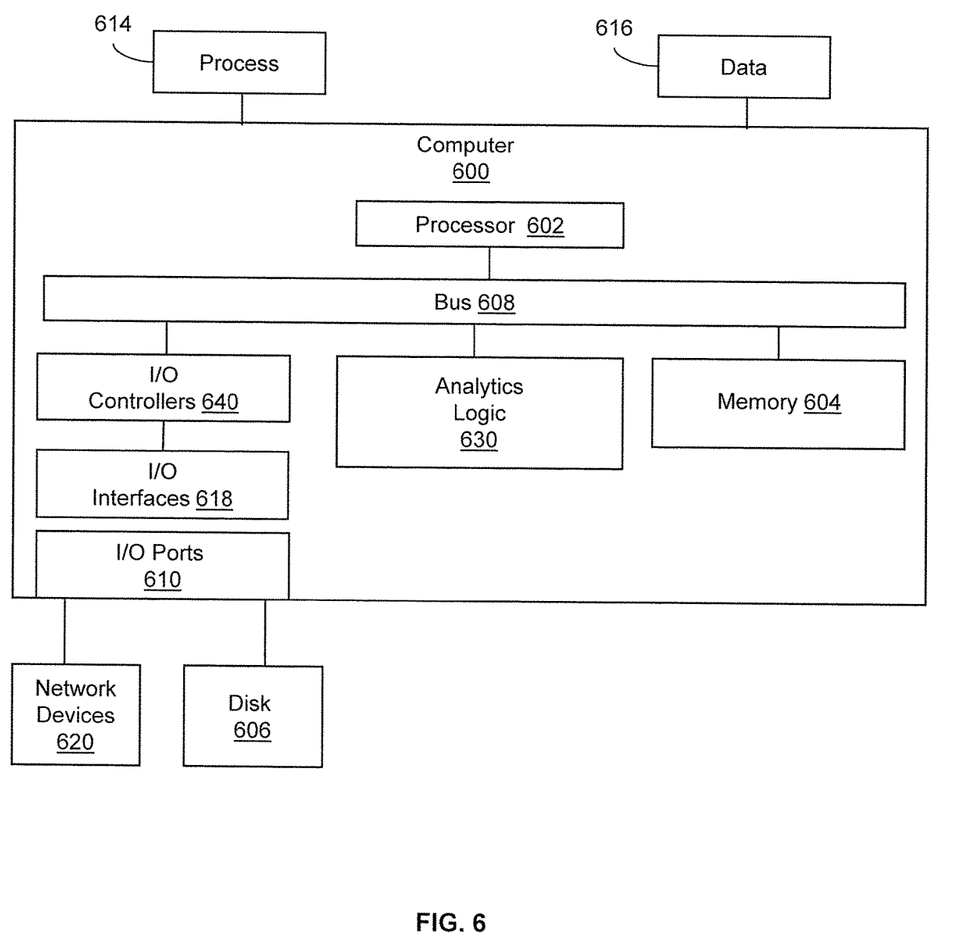
FIG. 6 illustrates one embodiment of a computing device upon which the analytics logic of a computing system (e.g., a relational database system) may be implemented.

FIG. 6 illustrates an example computing device that is configured and/or programmed with one or more of the example systems and methods described herein, and/or equivalents. FIG. 6 illustrates one embodiment of a computing device upon which analytics logic of a computing system (e.g., a relational database system) may be implemented. The example computing device may be a computer 600 that includes a processor 602, a memory 604, and input/output ports 610 operably connected by a bus 608.

In one example, the computer 600 may include analytics logic 630 (corresponding to analytics logic 110 from FIG. 1) which is configured to determine occurrences of frequent item sets in a set of transaction data while simultaneously aggregating metric values associated with the item sets. In different examples, logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, logic 630 could be implemented in the processor 602, a module stored in memory 604, or a module stored in disk 606.

In one embodiment, logic 630 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the performing of data mining on a set of transaction data and the generating of association rules based on item sets and aggregate metrics values resulting from the data mining. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) to determine occurrences of frequent item sets in a set of transaction data while simultaneously aggregating metric values associated with the item sets in preparation for forming association rules based on the item sets and the aggregated metrics values.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Systems, methods, and other embodiments have been described that are configured to perform data mining on sets of transaction data to form useful association rules. In one embodiment, counting logic is configured to read records of transaction data, one record at a time, and count a number-of-occurrences of at least one candidate item set to generate a total count. The candidate item set is under consideration for being a frequent item set in the records of transaction data. The records of transaction data represent multiple instances of transactions with respect to multiple items, where each item is represented by an item identifier and at least one metric value. Aggregation logic is configured to generate, as the counting is proceeding, at least one aggregate metric value associated with the candidate item set by summing metric values across the number-of-occurrences for each item represented in the candidate item set. Level filtering logic is configured to exclude the candidate item set from being a frequent item set, or confirm that the candidate item set is a frequent item set, by comparing the total count to a specified threshold value.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by at least a processor for executing instructions from a memory, the method comprising:
    identifying at least one candidate item set, wherein the at least one candidate item set is under consideration for being at least one frequent item set in a set of transaction data that includes a plurality of transaction records stored in a data cache of a relational database system;
    reading the plurality of transaction records, one at a time, from the data cache via at least the processor, wherein each transaction record of the plurality of transaction records represents a transaction for at least one item and includes transaction data that includes an item identifier and a metric value for the at least one item;
    counting a number-of-occurrences of the at least one candidate item set in the plurality of transaction records, via at least the processor, to generate a total count for the at least one candidate item set;
    as the counting is proceeding through the plurality of transaction records, simultaneously accumulating at least one aggregate metric value from corresponding transaction records associated with the at least one candidate item set, wherein the accumulating is performed by at least the processor including at least in part by summing metric values across the number-of-occurrences for each item represented in the at least one candidate item set;
    wherein simultaneously accumulating the at least one aggregate metric value includes accumulating, for at least one item represented in the at least one candidate item set, at least one of:
        a revenue value representing a revenue received for the at least one item in a transaction represented in the set of transaction data;
        a profit value representing a profit made on the at least one item in the transaction represented in the set of transaction data; or
        a quantity value representing a quantity of the at least one item purchased in the transaction represented in the set of transaction data;
    determining, by at least the processor, whether the at least one candidate item set is the at least one frequent item set at least in part by comparing the total count to a specified threshold value;

for the at least one frequent item set determined, generating, via at least the processor, at least one candidate association rule that (i) defines and associates at least two items from the at least one frequent item set in an if-then relationship, and (ii) includes a confidence value that reflects a strength of association of the at least two items based at least in part on the total count; and identifying, via at least the processor, the at least one candidate association rule as a final association rule at least in part by comparing the confidence value of the at least one candidate association rule to a specified threshold probability level.

2. The method of claim 1, further comprising pre-processing the set of transaction data, via at least the processor, to perform at least one of:

positioning items in each transaction record of the plurality of transaction records in a canonical order in preparation for applying a prefix tree methodology; and generating at least one bitmap array for items associated with the at least one candidate item set, and generating at least one metric value array corresponding to the at least one bitmap array in preparation for applying a bitmap methodology.

3. The method of claim 1, wherein the counting is performed using a prefix tree methodology via at least the processor.

4. The method of claim 1, wherein the counting is performed using a bitmap methodology via at least the processor.

5. The method of claim 1, further comprising controlling user specification of the specified threshold value via a graphical user interface or an application program interface.

6. The method of claim 1, wherein the identifying of the at least one candidate item set is accomplished at least in part by performing a search, in an ordered progression, over an item set search space associated with a plurality of items.

7. The method of claim 1, wherein the identifying of the at least one candidate item set is accomplished at least in part by at least one of:

user specification of the at least one candidate item set via a graphical user interface or an application program interface; or application specification of the at least one candidate items set via an application of the relational database system.

8. The method of claim 1, further comprising controlling user specification of the specified threshold probability level via a graphical user interface or an application program interface.

9. A relational database system, comprising:

a processor;

a data cache configured to store records of transaction data, wherein the records of transaction data represent multiple instances of transactions with respect to a plurality of items each represented by an item identifier and at least one metric value;

a counting module stored in a non-transitory computer-readable medium including instructions that when executed cause the processor to perform:

reading each of the records of transaction data to identify occurrences of at least one candidate item set, and counting a number-of-occurrences of the at least one candidate item set to generate a total count, wherein the at least one candidate item set is under consideration for being at least one frequent item set in the records of transaction data;

an aggregation module stored in the non-transitory computer-readable medium including instructions that when executed cause the processor to perform, as the counting is proceeding through the records of transaction data, simultaneously generating of at least one aggregate metric value from corresponding records associated with the at least one candidate item set, wherein the generating is performed at least in part by summing metric values across the number-of-occurrences for each item represented in the at least one candidate item set;

wherein simultaneously generating the at least one aggregate metric value includes accumulating, for at least one item represented in the at least one candidate item set, at least one of:

a revenue value representing a revenue received for the at least one item in a transaction represented in the set of transaction data;

a profit value representing a profit made on the at least one item in the transaction represented in the set of transaction data; or a quantity value representing a quantity of the at least one item purchased in the transaction represented in the set of transaction data;

a level filtering module stored in the non-transitory computer-readable medium including instructions that when executed cause the processor to perform a filtering operation to:

exclude the at least one candidate item set from being the at least one frequent item set at least in part by comparing the total count to a specified threshold value, or confirm that the at least one candidate item set is the at least one frequent item set at least in part by comparing the total count to the specified threshold value;

an association rule module stored in the non-transitory computer-readable medium including instructions that when executed cause the processor to:

for the at least one frequent item set determined, generate at least one candidate association rule that (i) associates at least two items from the at least one frequent item set in an if-then relationship and (ii) includes a confidence value that reflects a strength of association of the at least two items based at least in part on the total count; and a rule filtering module stored in the non-transitory computer-readable medium including instructions that when executed cause the processor to identify the at least one candidate association rule as a final association rule at least in part by comparing the confidence value of the at least one candidate association rule to a specified threshold probability level.

10. The relational database system of claim 9, further comprising a pre-processing module stored in the non-transitory computer-readable medium including instructions that when executed cause the processor to perform at least one of:

positioning items in each record of the records of transaction data in a canonical order in preparation for applying a prefix tree methodology; and generating at least one bitmap array for items associated with the at least one candidate item set, and generating at least one metric value array corresponding to the at least one bitmap array in preparation for applying a bitmap methodology.

11. The relational database system of claim 9, further comprising a visual user interface module stored in the non-transitory computer-readable medium including instructions that when executed cause the processor to provide a graphical user interface that controls user specification of the specified threshold probability level.

12. The relational database system of claim 9, further comprising a visual user interface module stored in the non-transitory computer-readable medium including instructions that when executed cause the processor to provide a graphical user interface that controls user specification of the specified threshold value.

13. The relational database system of claim 12, further comprising a display screen configured to display and facilitate user interaction with at least the graphical user interface provided by the visual user interface module.

14. A non-transitory computer-readable medium storing instructions that, when executed by one or more processors of a computing device, cause the computing device to at least:
control a reading of a plurality of transaction records, via the one or more processors, wherein each transaction record of the plurality of transaction records represents a transaction for at least one item and includes transaction data that includes an item identifier and a metric value for the at least one item;
control a counting of a number-of-occurrences of at least one candidate item set in the plurality of transaction records, via the one or more processors, to generate a total count for the at least one candidate item set, wherein the at least one candidate item set is under consideration for being at least one frequent item set in the plurality of transaction records;
as the counting of the number-of-occurrences is proceeding through the plurality of transaction records, simultaneously control an accumulating of at least one aggregate metric value from corresponding transaction records associated with the at least one candidate item set, wherein the accumulating is performed at least in part by summing metric values across the number-of-occurrences for each item represented in the at least one candidate item set;
wherein simultaneously controlling the accumulating of the at least one aggregate metric value includes accumulating, for at least one item represented in the at least one candidate item set, at least one of:
a revenue value representing a revenue received for the at least one item in a transaction represented in the set of transaction data;
a profit value representing a profit made on the at least one item in the transaction represented in the set of transaction data; or
a quantity value representing a quantity of the at least one item purchased in the transaction represented in the set of transaction data:
control a determination of whether the at least one candidate item set is the at least one frequent item set at least in part by comparing the total count to a specified threshold value via the one or more processors;
wherein the determination of being the at least one frequent item set is performed simultaneously with the accumulating of the at least one aggregate metric;
for the at least one frequent item set determined, generating, via at least the processor, at least one candidate association rule that (i) defines and associates at least two items from the at least one frequent item set in an if-then relationship, and (ii) includes a confidence value that reflects a strength of association of the at least two items based at least in part on the total count; and
after the generating of the at least one candidate association rule, at least identify, via the one or more processors, the at least one candidate association rule as a final association rule at least in part by comparing the confidence value of the at least one candidate association rule to a specified threshold probability level.

15. The non-transitory computer-readable medium of claim 14, wherein the instructions further comprise instructions that, when executed by the one or more processors, cause the computing device to at least control user specification of the specified threshold value and the specified threshold probability level via a graphical user interface or an application program interface.

* * * * *

UNITED STATES PATENT AND TRADEMARK OFFICE
CERTIFICATE OF CORRECTION

PATENT NO. : 10,885,047 B2
APPLICATION NO. : 15/200028
DATED : January 5, 2021
INVENTOR(S) : Mozes et al.

It is certified that error appears in the above-identified patent and that said Letters Patent is hereby corrected as shown below:

In the Specification

In Column 15, Line 15, delete "(4)" and insert -- (3) --, therefor.

In the Claims

In Column 24, Line 13, in Claim 14, delete "data:" and insert -- data; --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*